US00RE40382E

(19) United States
(12) Reissued Patent
Sato et al.

(10) Patent Number: US RE40,382 E
(45) Date of Reissued Patent: Jun. 17, 2008

(54) APPARATUS FOR CONTROLLING A THROTTLE VALVE ELECTRONICALLY IN AN INTERNAL COMBUSTION ENGINE

(75) Inventors: Hisaaki Sato, Gunma (JP); Ikuo Mogi, Gunma (JP); Masato Kumagai, Saitama (JP); Munehiro Kudo, Gunma (JP); Keiichi Kai, Gunma (JP)

(73) Assignee: Hitachi, Ltd., Tokyo (JP)

(21) Appl. No.: 11/585,994

(22) Filed: Oct. 25, 2006

Related U.S. Patent Documents

Reissue of:
(64) Patent No.: 5,979,405
Issued: Nov. 9, 1999
Appl. No.: 09/035,069
Filed: Mar. 5, 1998

(30) Foreign Application Priority Data

Mar. 13, 1997 (JP) ..... 9-058662

(51) Int. Cl.
*F02D 11/10* (2006.01)

(52) U.S. Cl. ..... 123/399
(58) Field of Classification Search ..... 123/399, 123/400
See application file for complete search history.

(56) References Cited

U.S. PATENT DOCUMENTS

| | | | | | |
|---|---|---|---|---|---|
| 4,809,659 | A | * | 3/1989 | Tamaki et al. | 123/399 |
| 5,209,055 | A | | 5/1993 | Hini et al. | |
| 5,350,034 | A | * | 9/1994 | Sato | 180/197 |
| 5,423,299 | A | * | 6/1995 | Kumagai | 123/399 |
| 5,431,141 | A | * | 7/1995 | Kanazawa et al. | 123/399 |
| 5,467,751 | A | * | 11/1995 | Kumagai | 123/399 |
| 5,490,487 | A | * | 2/1996 | Kato et al. | 123/399 |
| 5,687,691 | A | | 11/1997 | Kaiser et al. | |
| 5,738,072 | A | * | 4/1998 | Bolte et al. | 123/399 |
| 5,868,114 | A | * | 2/1999 | Kamimura et al. | 123/399 |
| 5,947,155 | A | * | 9/1999 | Miki et al. | 137/625.65 |
| 5,983,858 | A | | 11/1999 | Hashimoto et al. | |
| 6,315,277 | B1 | * | 11/2001 | Nagasawa | 267/140.14 |
| 6,973,917 | B2 | * | 12/2005 | Shimada | 123/399 |
| 7,117,845 | B2 | * | 10/2006 | Iwaoka et al. | 123/337 |

FOREIGN PATENT DOCUMENTS

| | | | | |
|---|---|---|---|---|
| DE | 39 14777 | A1 | | 11/1990 |
| DE | 41 33 380 | A1 | | 4/1993 |
| DE | 42 09 586 | A1 | | 9/1993 |
| DE | 43 42 949 | A1 | | 6/1995 |
| DE | 195 10 622 | A1 | | 9/1996 |
| EP | 0723072 | A1 | * | 1/1996 |
| EP | 0 723 072 | B1 | | 7/1996 |
| JP | 51-37212 | U | | 3/1976 |
| JP | 60-25364 | U | | 2/1985 |
| JP | 63-182657 | U | | 7/1988 |
| JP | 6-63460 | | * | 8/1994 |
| JP | 7-166897 | | | 6/1995 |
| JP | 8-93533 | A | | 4/1996 |
| JP | 10-89096 | | | 4/1998 |
| JP | 10-131772 | | | 5/1998 |

* cited by examiner

*Primary Examiner*—Thomas Moulis
(74) *Attorney, Agent, or Firm*—Foley & Lardner LLP

(57) ABSTRACT

An apparatus for controlling a throttle valve electronically in an internal combustion engine. The actuator 2 is supported on a body 1A by fixing a base plate 7 to a flange 1B of the body 1A with a bolt 6, and an elastic member 9 is fixed at an outer surface of a cylindrical projection 2C which is positioned on one end 2B of the body of the actuator 2. The inner surface of a case 1C of the body 1A covers cylindrical projection 2C. One end 2B of the body of the actuator 2, opposite the actuator output end, is thus supported by the body 1A via elastic member 9. Therefore, it is not necessary to provide a heavy wall thickness of the flange by which the actuator 2 is supported or of the body of the actuator, and increase the strength of the internal structure of the actuator, and increase weight, size, and cost of the actuator.

69 Claims, 4 Drawing Sheets

APPARATUS FOR CONTROLLING A THROTTLE VALVE ELECTRONICALLY IN AN INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

1. Field of The Invention

The present invention relates to improvements to an apparatus for controlling a throttle valve electronically, such as an electronic motor, in an internal combustion engine.

2. Description of The Background Art

The previously known apparatus 1, as shown in FIG. 6, is installed in an intake air passage of an internal combustion engine, and the actuator 2 (such as an electronic motor) generates driving power on the basis of a driving signal of the control unit, which can open/close the throttle valve through the gear wheel transfer structure 3 and the axis 4 and related structure. The actuator can make an adjustment to the open angle of the throttle valve, which is separated from the accelerator operation of the driver. However, the actuator 2 is fixed on the flange 1B of the body 1A with a bolt 6. Thus, a one end supporting structure is used, which has the defects discussed below.

A one end supporting structure does not have enough anti-vibration control, and the actuator 2 is vibrated easily by the contrary rotation power on one end 2A side, which is the starting point. This problem could be reduced by making a heavy wall thickness of the flange and the body of the actuator 2, or increasing the strength of the internal structure of the actuator 2. However, this increases the weight, the size, and the cost.

Furthermore, the anti-vibration characteristics may be improved by fixing the free end 2B side of the actuator 2 (non-output side) on the case 1C of the body 1A with a press fit. But in this case, high accuracy may be needed to maintain the precision position to the gear wheel transfer structure 3. As a result, this may make assembly more difficult and increase the cost by a large amount.

SUMMARY OF THE INVENTION

It is, therefore, an object of the present invention to provide an apparatus for controlling a throttle valve electronically in an internal combustion engine which addresses the above situation by improving the anti-vibration characteristics, while reducing the cost and providing a simple structure.

In view of the above, an apparatus for controlling a throttle valve electronically according to the present invention comprises a throttle valve installed in an intake air passage of an internal combustion engine, and an actuator to control the throttle valve to open/close, and a supporting member to fasten a body of the actuator on the output side of the actuator, and a cover member to cover the body of the actuator, which has a predetermined gap to the cover member, and which is supported independently from open/close control of the throttle valve on the non-output side of the actuator, and an elastic member in the predetermined gap.

With such a structure for the present invention, the non-output side of the body is supported by the elastic member, and both ends are supported instead of one end, and the anti-vibration characteristics can be improved effectively even though a simple and low cost structure is used.

That is to say, it is not necessary to make a heavy wall thickness of the flange by which the actuator 2 is supported or of the body of the actuator, and increase the strength of the internal structure of the actuator, and increase the weight, the size, and the cost of the actuator.

Furthermore, the actuator can be fixed flexibility on, and there is no need to require high precision work for precision positioning, which can make assembly more difficult and increase the cost.

In addition, the elastic member is placed in the predetermined gap which is formed between the cylindrical outer side of the actuator which is covered by the cover member on the non-output side and the inside of the cover member, or the elastic member is placed in the predetermined gap which is formed between the plane perpendicular to the output axis of the actuator and the inside of the cover member.

Also, the present invention further comprises fixing means to fix the elastic member in the predetermined gap which is formed between the cylindrical outer side of the actuator, which is covered by the cover member on the non-output side, and the inside of the cover member, and as a result, the fixing means restricts the movement of the elastic member along the cylindrical central axis of the non-output side of the actuator.

DETAILED DESCRIPTION OF THE PREFERRED EMBODIMENTS

Figure 6:
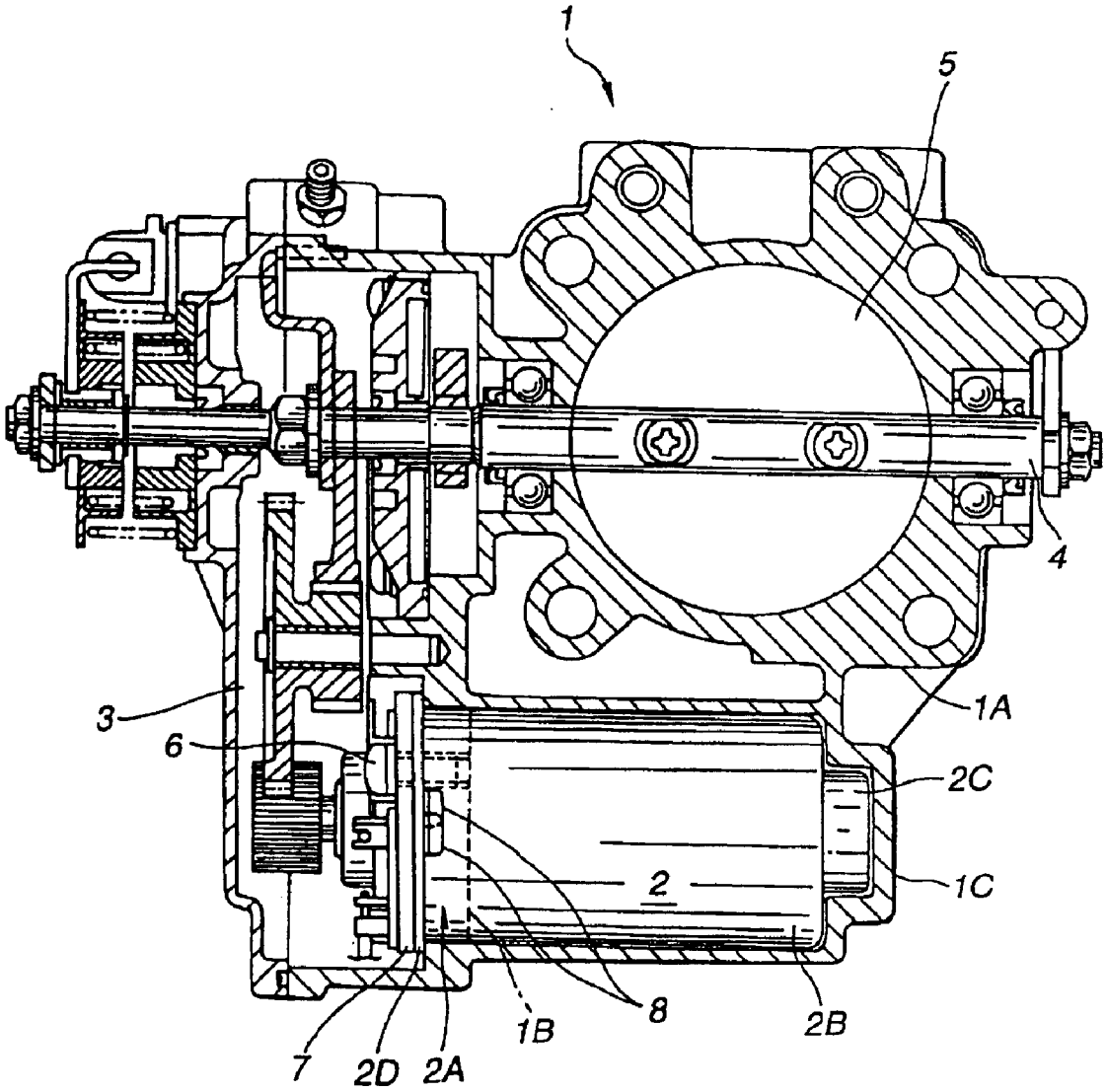
FIG.6 PRIOR ART
FIG. 6 is a section view of an apparatus for controlling a throttle valve electronically according to the previously known apparatus.

A more detailed description of the present invention is given below on the basis of attached figures which are provided with the same numbers for the same elements as shown in FIG. 6.

Figure 1:
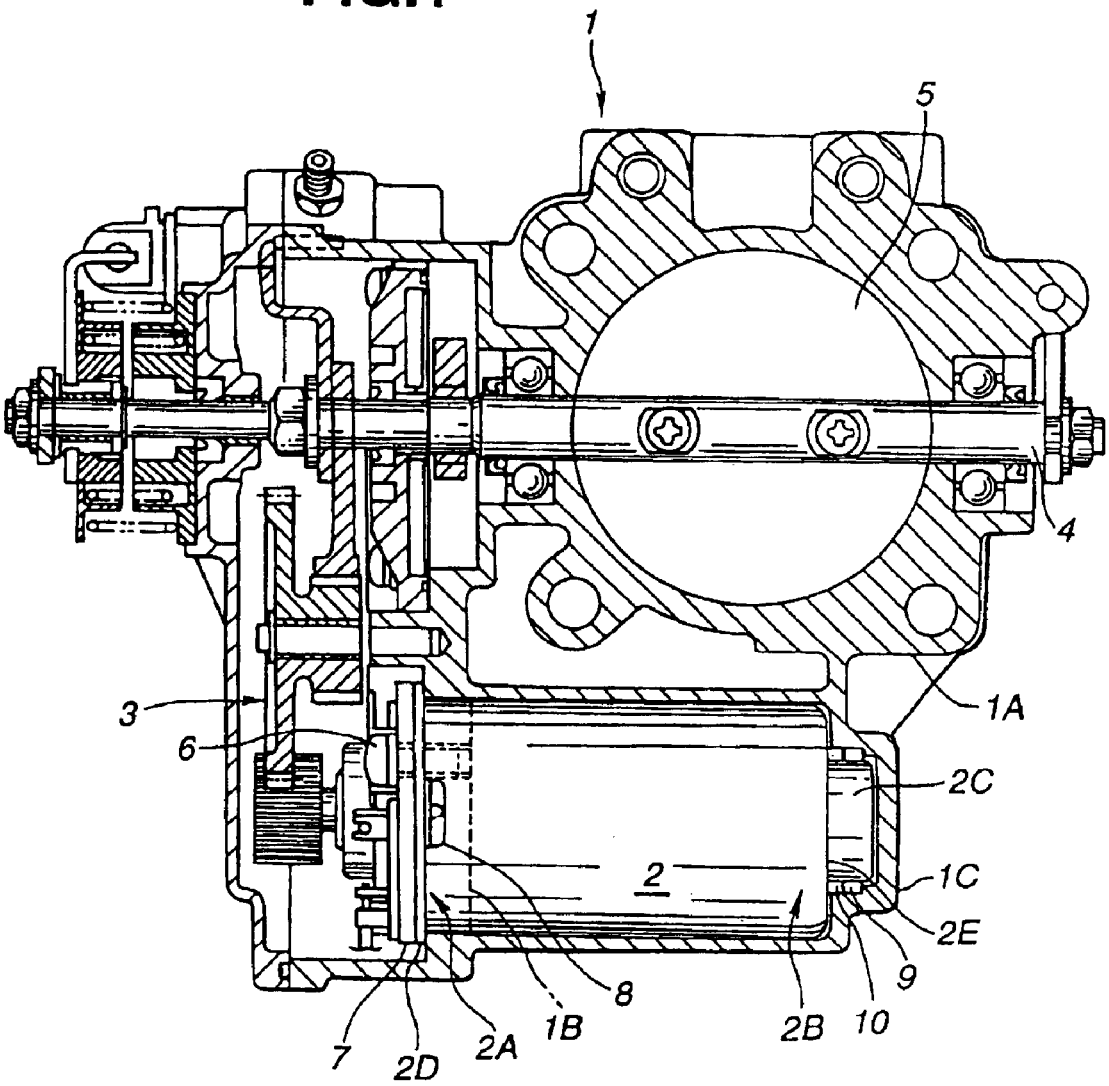
FIG. 1 is a section view of an apparatus for controlling a throttle valve electronically according to the first embodiment of the present invention.

The first embodiment associated with the present invention is shown in FIG. 1, which indicates the throttle valve 5 installed in an intake air passage of an internal combustion engine, and the intake air passage area can be adjusted by the throttle valve 5, which opens/closes around the rotation axis 4. The actuator 2, such as an electronic motor, generates driving power on the basis of a driving signal of the control unit (not shown), which can make an adjustment to the open angle of the throttle valve, which is separated from the accelerator operation of the driver.

The actuator 2 associated with the first embodiment is fixed via the flange 2D of the body of the actuator 2 to the base plate 7 with a bolt 8, and the actuator 2 and base plate 7 are fixed on the body 1A by fixing the base plate 7 to the flange 1B of the main body 1 with the bolt 6. The bolt 6, the base plate 7, and the bolt 8 form a supporting member.

However, if the actuator 2 is fixed to the body 1A on only one end 2A side (output side) of the actuator 2, the anti-vibration characteristics will deteriorate at one end. But in the first embodiment, the actuator is not only fixed to the body 1A on one end 2A side (output side), but also on the other end 2B side (non-output side). As a result, anti-vibration characteristics are improved. An elastic member 9 (an o-ring made of rubber, silicon, and so on) is fixed between the outer surface of the cylindrical projection 2C which is positioned on one end 2B side of the body of the actuator 2 and the inner surface of the case, or cover, 1C of the body 1A in which the cylindrical projection 2C is covered, and therefore, the end 2B side of the body of the actuator 2 is supported by the body 1A. In this way, a supporting structure which supports both ends is provided instead of a structure supporting one end. The structure by the end 2B side of the body of the actuator 2 is supported on the body 1A with the o-ring, and the anti-vibration characteristic is improved effectively even though a simple and a low cost structure is provided. That is to say, it is not necessary to make a heavy wall thickness of the flange by which the actuator 2 is supported or of the body of the actuator, and increase the strength of the internal structure of the actuator, and increase the weight, the size, and the cost of the actuator.

Furthermore, the actuator can be fixed flexibility on the case 1C of the body 1A with the o-ring, which does not require high precision work for precision fit and precision positioning to the gear wheel transfer structure 3. This makes assembly easier and reduces cost.

In the preferred embodiment, the o-ring for the elastic member is a standard o-ring, which is preferable from the view point of lower cost. In addition, a backup-ring 10 (the ring member consists of metal, plastic, gum, silicon and so on) which is positioned between the elastic member 9 and one end 2E of the body of the actuator 2, has the function of fixing the member 9 and preventing torsion and other movment of the elastic member 9 as shown in FIG. 1, and is preferable from the view point of cost. Furthermore, the outer surface of the projection 2C of the body of the actuator 2 can be in the shape of a step and have the same function and effect as the back-up-ring 10 as shown in FIG. 1. Also, the inner surface of the case 1C of the body 1A can have a flute in which the elastic member 9 is supported, and have the same function and effect as the back-up-ring 10 as shown in FIG. 1.

Figure 2:
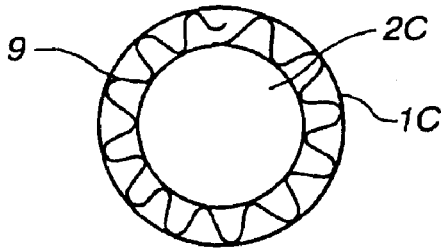
FIG. 2 is a part side view of using another elastic member.

The elastic member 9 can also be an elastic member of wave shape (metal, plastic, gum, silicon and so on) as shown in FIG. 2.

Although the first embodiment has the elastic member 9 fixed on the outer surface of the projection 2C of the body of the actuator 2, the invention is not limited to the above-mentioned structure. If supporting structure is provided at both ends instead of at one end by other means, for example, the elastic member 9 is fixed on the outer surface of the body of the actuator 2 other than the projection 2C, a similar result will be obtained.

Figure 3A:
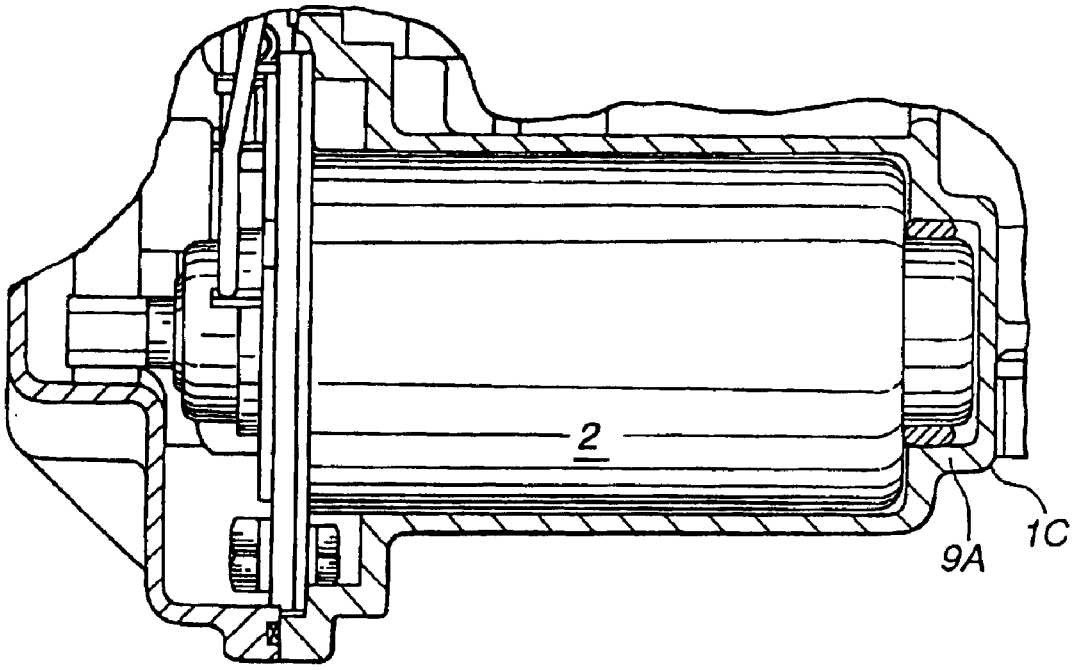
FIG. 3(A) is a part of another elastic member magnified.
Figure 3B:
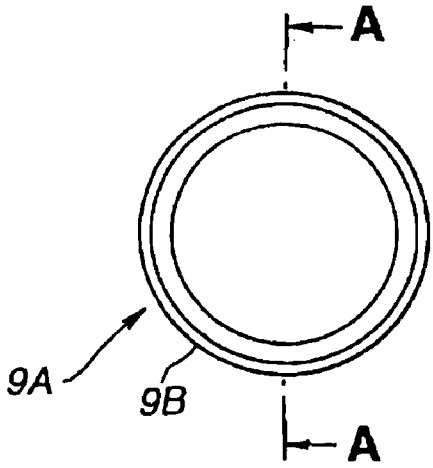
FIG. 3(B) is a front view of the elastic member shown FIG. 3(A).
Figure 3C:
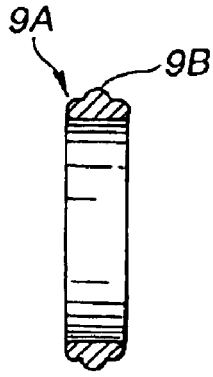
FIG. 3(C) is an III(C)—III(C) section view of FIG. 3(B).

In the above first embodiment, it is preferable to have the back-up-ring 10 positioned between the elastic member 9 and one end 2E of the body of the actuator 2, for ease of assembly and to prevent the torsion and other movement of the elastic member 9 as shown FIG. 1. Alternatively, o-ring 9A, which has a cross-sectional flat shape and a projection 9B in the direction of the outer surface for keeping the strength of supporting the actuator 2, as shown in FIGS. 3(A) to 3(C) can be provided. If the o-ring 9A is used, it is capable of adequately supporting the actuator, allows easy assembly, and prevents the torsion of the elastic member.

Next is a description of a second embodiment of the present invention. The above embodiment employs the elastic member 9 fixed on the outer surface of the projection 2C of the body of the actuator 2, which is supported at both ends by supporting structure to improve the anti-vibration characteristics. The second embodiment can also improve the anti-vibration characteristics, as discussed below.

A more detailed description of the second embodiment is provided with same numbers for the same elements as shown in FIG. 6 or FIG. 1 associated with the first is embodiment.

Figure 4:
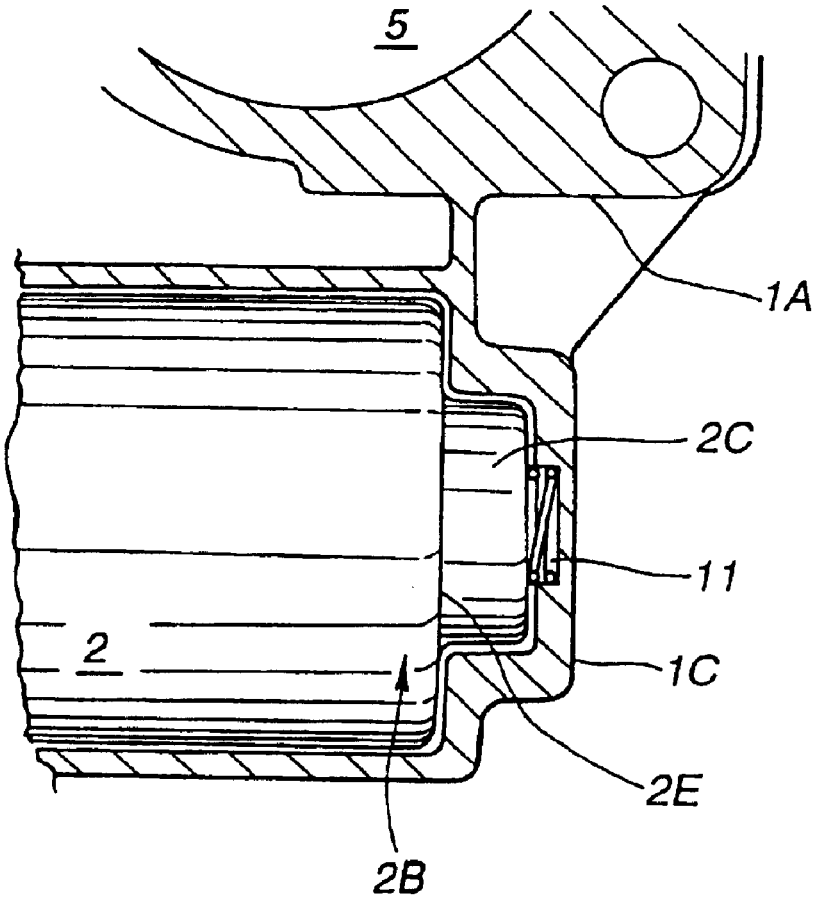
FIG. 4 is a part of the second embodiment of the present invention magnified.

The elastic member 11 (for example, a coil shaped spring) is fixed between one end of the projection 2C of the body of the actuator 2 and the inner surface of the case of the body 1A, as shown in FIG. 4. In addition, a part of the elastic member 11 is fitted into a depression, which fixes member 11. Therefore, the movement (vibration) of the end 2B of the body of the actuator 2 is prevented by the strength of supporting the actuator 2 on one end of the projection 2C using the elastic member 11 which produces friction between the elastic member 11 and the end of the projection 2C. This improves anti-vibration characteristics effectively even though the structure is simple and inexpensive. That is to say, it is not necessary to make a heavy wall thickness of the flange by which the actuator 2 is supported or of the body of the actuator, and increase the strength of the internal structure of the actuator, and increase the weight, the size, and the cost of the actuator. Furthermore, the end 2B side of the actuator can be fixed flexibility on the case 1C of the body 1A, which eliminates high precision work for precision fit and precision positioning to the gear wheel transfer structure 3. This makes assembly easier and reduces cost.

Figure 5:
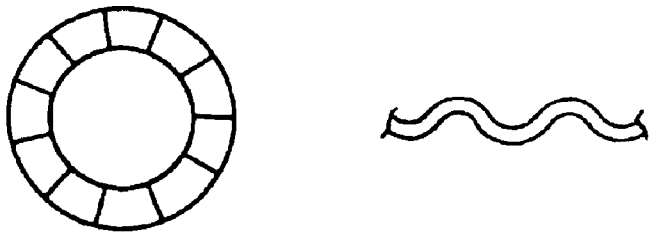
FIGS. 5 are views of another elastic member.

The elastic member 11 can also be an elastic member of a solid or hollow-body shape or bow shape (gum, silicon and so on) instead of the coil shaped and an elastic member of a ring shape (gum, silicon and so on). Furthermore, a wave-washer as shown in the FIG. 5(A) end view and FIG. 5(B) sectional view can be employed instead of the elastic member of the coil shaped as shown in FIG. 4. In addition, the invention can use both the elastic member 9 of the first embodiment and the elastic member 11 of the second embodiment, which can further improve the anti-vibration characteristics effectively, and the present invention can also be adaptable to a structure which does not have the projection 2C.

Furthermore, the present invention can also be adapted to a case 1C which is not integral with the body 1A. Also, the present invention can be adapted to the case 1C which only covers one end 2B of the body of the actuator 2 (i.e., only part of the non-output side) instead of covering most of the actuator.

The entire contents of Japanese Patent Application No. Tokuganhei 9-058662, filed Mar. 13, 1997, is incorporated herein by reference.

What is claimed is:

1. An apparatus for controlling a throttle valve electronically in an internal combustion engine, comprising:

a) a main body;

b) a throttle valve installed in an intake air passage of an internal combustion engine;

c) an actuator to control said throttle valve to open/close;

d) a supporting member to fasten a body of said actuator to said main body on an output side of said actuator;

e) a cover member to cover said body of said actuator and which is supported near a non-output side of said actuator by the main body, *the body of* said actuator having a predetermined gap to said cover member; and f) an elastic member in said predetermined gap on said non-output side of said actuator, *wherein said elastic member is placed between a plane perpendicular to an output axis of said actuator and inside of said cover member so as to restrict axial movement of said elastic member in an axial direction of the output axis of said actuator between the plane perpendicular to the output axis of said actuator and the inside of said cover member.*

2. An apparatus for controlling a throttle valve electronically in an internal combustion engine as set forth in claim 1, wherein said elastic member is [formed] *placed* between a cylindrical outer side of *the body of* said actuator on the non-output side and inside of said cover member.

[3. An apparatus for controlling a throttle valve electronically in an internal combustion engine as set forth in claim 1, wherein said elastic member is formed between a plane perpendicular to an output axis of said actuator and inside of said cover member.]

4. An apparatus for controlling a throttle valve electronically in an internal combustion engine [as set forth in claim 1, which further comprises], *comprising:*

*a) a main body;*

*b) a throttle valve installed in an intake air passage of an internal combustion engine;*

*c) an actuator to control said throttle valve to open/close;*

*d) a supporting member to fasten a body of said actuator to said main body on an output side of said actuator;*

*e) a cover member to cover said body of said actuator and which is supported near a non-output side of said actuator by the main body, said actuator having a predetermined gap to said cover member;*

*f) an elastic member in said predetermined gap on said non-output side of said actuator; and* a fixing member to fix said elastic member at a predetermined position inside of said cover member.

5. An apparatus for controlling a throttle valve electronically in an internal combustion engine as set forth in claim 4, wherein said elastic member is formed between a cylindrical outer side of said actuator on the non-output side and inside of said cover member, and said fixing member restricts movement of said elastic member along a cylindrical central axis of said non-output side of said actuator.

6. An apparatus for controlling a throttle valve electronically in an internal combustion engine as set forth in claim 1, wherein said elastic member is an o-ring.

7. An apparatus for controlling a throttle valve electronically in an internal combustion engine, comprising:

a) a main body;

b) an open/close means *including a throttle valve* for adjusting flow in an intake air passage of an internal combustion engine;

c) an actuator means for controlling said open/close means, *said actuator means including a body extending from a first end on an output side to a second end on a non-output side in a longitudinal direction along a rotation axis of the throttle valve*;

d) a supporting means for fastening [a] *the first end of the* body of said actuator means to said main body on [an] *the* output side of said actuator means;

e) a cover means for covering said actuator means [and which is], *said cover means being* supported near [a] *the* non-output side of said actuator means by the main body, *the body of* said actuator means having a predetermined gap to said cover means, *the predetermined gap being formed between an end surface formed in the second end of the body of said actuator means and an inner surface of said cover means which are spaced apart from each other in the longitudinal direction of said actuator means*; and f) an elastic means *disposed tightly between the end surface of the body of said actuator means and the inner surface of said cover means* in said predetermined gap on said non-output side of said actuator means, *for flexibly supporting the second end of the body of said actuator means.*

8. An apparatus for controlling a throttle valve electronically in an internal combustion engine as set forth in claim 7, wherein said elastic means is [formed] *placed* between a cylindrical outer side of *the body of* said actuator means on the non-output side and [inside] *the inner surface* of said cover means.

9. An apparatus for controlling a throttle valve electronically in an internal combustion engine as set forth in claim 7, wherein said elastic means is [formed] *placed* between [a plane] *the end surface of the second end of the body of said actuator means which is* perpendicular to [a n] *an* output axis of said actuator means and [inside] *the inner surface* of said cover means.

10. An apparatus for controlling a throttle valve electronically in an internal combustion engine [as set forth in claim 7, which further comprises], *comprising:*

*a) a main body;*

*b) an open/close means for adjusting flow in an intake air passage of an internal combustion engine;*

*c) an actuator means for controlling said open/close means;*

*d) a supporting means for fastening a body of said actuator means to said main body on an output side of said actuator means;*

*e) a cover means for covering said actuator means and which is supported near a non-output side of said actuator means by the main body, said actuator means having a predetermined gap to said cover means;*

*f) an elastic means in said predetermined gap on said non-output side of said actuator means; and* fixing means for fixing said elastic means at a predetermined position inside of said cover means.

11. An apparatus for controlling a throttle valve electronically in an internal combustion engine as set forth in claim 10, wherein said elastic means is formed between a cylindrical outer side of said actuator means on the non-output side and the inside of said cover means, and said fixing means restricts movement of said elastic means along a cylindrical central axis of said non-output side of said actuator means.

12. An apparatus for controlling a throttle valve electronically in an internal combustion engine as set forth in claim 7, wherein said elastic means is an o-ring.

*13. An apparatus for controlling a throttle valve electronically in an internal combustion engine as set forth in claim 1, wherein the body of said actuator extends from a first end on the output side of the actuator to a second end on the non-output side of the actuator, along a rotation axis of said throttle valve.*

*14. An apparatus for controlling a throttle valve electronically in an internal combustion engine as set forth in claim 13, wherein the second end of the body of said*

*actuator is loosely fit in a recess of the cover member with a clearance surrounding the second end of the body of said actuator; and said elastic member is disposed between the second end of the body of said actuator and the cover member.*

*15. An apparatus for controlling a throttle valve electronically in an internal combustion engine as set forth in claim 14, wherein said elastic member is disposed tightly between an end surface of the body of the actuator facing the non-output side and an inner surface of the cover member facing the output side, and confronting the end surface of the body of the actuator.*

*16. An apparatus for controlling a throttle valve electronically in an internal combustion engine as set forth in claim 15, wherein the elastic member includes one side abutting on the end surface of the body of the actuator and producing a friction between the elastic member and the end surface of the body of the actuator.*

*17. An apparatus for controlling a throttle valve electronically in an internal combustion engine as set forth in claim 15, wherein said elastic member is a wave washer disposed between the body of the actuator and the cover member, and arranged to sustain an axial load between the body of the actuator and the cover member.*

*18. An apparatus for controlling a throttle valve electronically in an internal combustion engine as set forth in claim 15, wherein the body of said actuator includes a cylindrical projection projecting from the end surface of the body of the actuator to the non-output side; the end surface of the actuator is an annular flat surface facing axially to the non-output side in the direction of the output axis of the actuator; and said elastic member is a ring-shaped member positioned around the cylindrical projection of the body of the actuator and confined between the end surface of the body of the actuator and the inner surface of the cover member so as to sustain axial load between the end surface of the actuator and the inner surface of the cover member.*

*19. An apparatus for controlling a throttle valve electronically in an internal combustion engine as set forth in claim 1, wherein said actuator is arranged to produce rotation about a first rotation axis, and to transmit the rotation to the throttle valve to swing the throttle valve about a second rotation axis; and*

*wherein said actuator is disposed so that the first rotation axis of said actuator is parallel to the second rotation axis of the throttle valve.*

*20. An apparatus for controlling a throttle valve electronically in an internal combustion engine as set forth in claim 19, wherein said elastic member is disposed between an end surface of the body of the actuator that faces in a direction axially towards the non-output side, along the first rotation axis of the actuator, and an inner surface of the cover member that faces in a direction axially towards the output side along the first rotation axis of the actuator.*

*21. An apparatus for controlling a throttle valve electronically in an internal combustion engine as set forth in claim 20, wherein said elastic member is a ring-shaped member including one side that abuts the end surface of the body of the actuator and produces friction between the elastic member and the end surface of the body of the actuator.*

*22. An apparatus for controlling a throttle valve electronically in an internal combustion engine as set forth in claim 20, wherein the body of the actuator includes a cylindrical projection that projects from the end surface of the body of the actuator in a direction axially towards the non-output side;*

*wherein the end surface of the body of the actuator is an annular flat surface that faces in the direction axially towards the non-output side along the first rotation axis of the actuator; and*

*wherein said elastic member is a ring-shaped member that surround the cylindrical projection of the body of the actuator and confined axially between the end surface of the actuator and the inner surface of the cover member so as to sustain axial load between the end surface of the body of the actuator and the inner surface of the cover member.*

*23. An apparatus for controlling a throttle valve electronically in an internal combustion engine as set forth in claim 22, wherein said elastic member has a wave shape.*

*24. An apparatus for controlling a throttle valve electronically in an internal combustion engine as set forth in claim 22, further comprising a second ring-shaped member positioned around the cylindrical projection of the body of the actuator,*

*wherein said elastic member and said second ring-shaped member are placed tightly between the end surface of the actuator and the inner surface of the cover member.*

*25. An apparatus for controlling a throttle valve electronically in an internal combustion engine as set forth in claim 1, wherein said elastic member is one of a solid member, a hollow member and a ring-shaped member.*

*26. An apparatus for controlling a throttle valve electronically in an internal combustion engine as set forth in claim 25, further comprising a fixing member that abuts against the elastic member to position the elastic member, wherein said fixing member is made of one of metal, plastic and rubber.*

*27. An apparatus for controlling a throttle valve electronically in an internal combustion engine as set forth in claim 1, wherein said elastic member is a wave washer.*

*28. An apparatus for controlling a throttle valve electronically in an internal combustion engine as set forth in claim 1, wherein said elastic member is made of one of metal, plastic and rubber.*

*29. An apparatus for controlling a throttle valve electronically in an internal combustion engine as set forth in claim 1, wherein said elastic member is a coil spring.*

*30. An apparatus for controlling a throttle valve electronically in an internal combustion engine as set forth in claim 1, wherein said elastic member is a wave washer disposed between the body of the actuator and the cover member, and arranged to sustain an axial load between the body of the actuator and the cover member.*

*31. An apparatus for controlling a throttle valve electronically in an internal combustion engine as set forth in claim 1, wherein said elastic member is a ring shaped member disposed between an end surface of the body of the actuator, which faces in a direction axially towards the non-output side, and an inner surface of the cover member that faces the end surface of the body of the actuator across the ring-shaped member.*

*32. An apparatus for controlling a throttle valve electronically in an internal combustion engine as set forth in claim 31, wherein the ring-shaped member includes a first side that abuts the end surface of the body of the actuator and produces friction between the elastic member and the end surface of the body of the actuator, and a second side that faces the inner surface of the cover member.*

*33. An apparatus for controlling a throttle valve electronically in an internal combustion engine as set forth in claim 1, wherein the actuator includes an electric motor.*

*34. An apparatus for controlling a throttle valve electronically in an internal combustion engine as set forth in*

*claim 1, further comprising a gear mechanism to transmit rotation from the actuator to the throttle valve.*

*35. An apparatus for controlling a throttle valve electronically in an internal combustion engine as set forth in claim 1, further comprising a back-up ring that abuts said elastic member.*

*36. An apparatus for controlling a throttle valve electronically in an internal combustion engine as set forth in claim 35, wherein said elastic member and said back-up ring are positioned between a surface of said actuator that is perpendicular to an output axis of said actuator and an inner surface of the inside of said cover member that is perpendicular to the output axis of said actuator.*

*37. An apparatus for controlling a throttle valve electronically in an internal combustion engine as set forth in claim 36, wherein the elastic member is wave washer.*

*38. An apparatus for controlling a throttle valve electronically in an internal combustion engine as set forth in claim 37, wherein the body of the actuator includes a main actuator body and a cylindrical projection extending outward from the main actuator body in a direction axially towards the non-output side, and*

*wherein the wave washer and back-up ring are positioned around the cylindrical projection.*

*39. An apparatus for controlling a throttle valve electronically in an internal combustion engine as set forth in claim 38, wherein the wave washer and back-up ring are sandwiched between the surface of the actuator and the inner surface of the cover member.*

*40. An apparatus for controlling a throttle valve electronically in an internal combustion engine as set forth in claim 39, wherein the supporting member includes a flange positioned at the output side of the actuator that fixes the body of the actuator to the main body, and the body of the actuator extends from the output side of the actuator to the non-output side of the actuator.*

*41. An apparatus for controlling a throttle valve electronically in an internal combustion engine as set forth in claim 1, wherein said elastic member is a wave washer that is positioned around a portion of the actuator.*

*42. An apparatus for controlling a throttle valve electronically in an internal combustion engine as set forth in claim 4, wherein said elastic member is placed between a cylindrical outer side of the body of said actuator on the non-output side and inside of said cover member, and said fixing member restricts the axial movement of said elastic member in the axial direction of the output axis of said actuator.*

*43. An apparatus for controlling a throttle valve electronically in an internal combustion engine as set forth in claim 7, wherein said actuator means further includes an internal structure encased in the body of said actuator.*

*44. An apparatus for controlling a throttle valve electronically in an internal combustion engine as set forth in claim 7, wherein said supporting means includes means for rigidly supporting the first end of the body of said actuator means;*

*wherein said cover means includes means for loosely fitting over the second end of the body of said actuator means to create the predetermined gap; and*

*wherein said elastic means includes means interposed between the body of said actuator means and said cover means, for flexibly supporting the second end of the body of said actuator means on the cover means.*

*45. An apparatus for controlling a throttle valve electronically in an internal combustion engine as set forth in claim 7, wherein said elastic means comprises a washer disposed between the body of the actuator means and the cover means, the washer being configured to sustain a load in the longitudinal direction of said actuator means between the body of the actuator means and the cover means.*

*46. An apparatus for controlling a throttle valve electronically in an internal combustion engine as set forth in claim 7, wherein said elastic means includes means for preventing vibration of the second end of the body of said actuator means.*

*47. An apparatus for controlling a throttle valve electronically in an internal combustion engine as set forth in claim 7, wherein said actuator means comprises an electric motor;*

*wherein said supporting means comprises a fastener; and*

*wherein said elastic means comprises a ring-shaped member.*

*48. An apparatus for controlling a throttle valve electronically in an internal combustion engine as set forth in claim 7, wherein the second end of the body of said actuator means is loosely fit in a recess formed in the cover means with a clearance surrounding the second end of the body of said actuator means.*

*49. An apparatus for controlling a throttle valve electronically in an internal combustion engine as set forth in claim 7, further comprising a back-up ring that abuts said elastic means.*

*50. An apparatus for controlling a throttle valve electronically in an internal combustion engine as set forth in claim 49, wherein said elastic means and said back-up ring are positioned between a surface of said actuator means that is perpendicular to an output axis of said actuator means and an inner surface of the inside of said cover means that is perpendicular to the output axis of said actuator means.*

*51. An apparatus for controlling a throttle valve electronically in an internal combustion engine as set forth in claim 50, wherein the elastic means is a wave washer.*

*52. An apparatus for controlling a throttle valve electronically in an internal combustion engine as set forth in claim 51, wherein the body of the actuator means includes a main actuator body and a cylindrical projection extending outward from the main actuator body in a direction axially towards the non-output side, and*

*wherein the wave washer and back-up ring is positioned around the cylindrical projection.*

*53. An apparatus for controlling a throttle valve electronically in an internal combustion engine as set forth in claim 51, wherein the wave washer and back-up ring are sandwiched between the surface of the actuator means and the inner surface of the cover means.*

*54. An apparatus for controlling a throttle valve electronically in an internal combustion engine as set forth in claim 7, wherein said elastic means is a wave washer that is positioned around a portion of the actuator means.*

*55. An apparatus for controlling a throttle valve electronically in an internal combustion engine as set forth in claim 7, which further comprises fixing means for fixing said elastic means at a predetermined position in the longitudinal direction of said actuator means, inside of said cover means.*

*56. An apparatus for electronically controlling a throttle valve in an internal combustion engine, comprising:*

*a throttle valve installed in an intake air passage of an internal combustion engine and arranged to rotate to regulate an intake air flow into the internal combustion engine;*

*a main throttle housing body enclosing the throttle valve;*

*an actuator to control said throttle valve to rotate open/close by producing a rotation about a rotation axis to*

*rotate said throttle valve, said actuator including an actuator casing body extending from a first end on an output side to a second end on a non-output side;*

*a transfer mechanism disposed on the output side of the actuator and arranged to transmit the rotation produced by the actuator to the throttle valve;*

*a cover to cover said actuator casing body, the cover configured to receive the actuator through an opening of the cover in an inserting direction along the rotation axis of the actuator, wherein the cover covers the actuator casing body of the actuator with a predetermined gap between the cover and the actuator casing body and is supported near the non-output side of said actuator by the main throttle housing body;*

*a supporting member to fasten the actuator casing body to the main throttle housing body on the output side of said actuator by fastening the first end of said actuator casing body to said main throttle housing body, and thereby supporting the first end of the actuator casing body fixedly on the main throttle housing body; and*

*an elastic member in said predetermined gap on said non-output side of said actuator, said elastic member is in the form of a wave washer disposed between a first surface of the actuator casing body and a second surface of the cover, the first and second surfaces confronting each other axially in an axial direction extending along the rotation axis of the actuator, the wave washer being arranged to apply a pushing force to the first surface of the actuator casing body, and thereby to support the second end of the actuator casing body on the main body.*

*57. An apparatus for electronically controlling a throttle valve in an internal combustion engine as set forth in claim 56, wherein the first surface of the actuator casing body is a flat surface perpendicular to the rotation axis of the actuator.*

*58. An apparatus for electronically controlling a throttle valve in an internal combustion engine as set forth in claim 56, wherein the apparatus further comprises a member to position the wave washer.*

*59. An apparatus for electronically controlling a throttle valve in an internal combustion engine as set forth in claim 56, wherein said wave washer abuts the first surface of the actuator casing body.*

*60. An apparatus for electronically controlling a throttle valve in an internal combustion engine as set forth in claim 56, wherein the actuator casing body includes a main housing body and a cylindrical projection extending outward from the main housing body in a direction towards the non-output side, and*

*wherein the wave washer is positioned around the cylindrical projection.*

*61. An apparatus for electronically controlling a throttle valve in an internal combustion engine as set forth in claim 60, further comprising a second ring, wherein the wave washer and the second ring are sandwiched between the first surface of the actuator housing body and the second surface of the cover.*

*62. An apparatus for electronically controlling a throttle valve in an internal combustion engine, comprising:*

*a main throttle housing body including a hole serving as an intake air passage for an internal combustion engine;*

*a throttle valve installed in the hole serving as the intake air passage of the internal combustion engine, and arranged to rotate on a rotation axis;*

*an electric motor that controls the throttle valve to open/close, the electric motor disposed so that a rotation axis of the electric motor is parallel to the rotation axis of the throttle valve, the electric motor including a motor casing body extending from a first end on an output side to a second end on a non-output side;*

*a cover covering the motor casing body of the electric motor, the motor casing body having a predetermined gap to the cover, the cover being supported near a non-output side of the motor casing body by the main throttle housing body;*

*a gear mechanism disposed on the output side of the motor and connected between the electric motor and the throttle valve to transmit a driving force of the electric motor to the throttle valve to rotate the throttle valve;*

*a supporting member to fixedly fasten the first end of the motor casing body to the main throttle housing body on the output side of the electric motor; and*

*an elastic member in the form of a wave washer disposed in the predetermined gap on the non-output side of the motor casing body between the motor casing body and the cover, and configured to urge the motor toward the output side of the motor.*

*63. An apparatus for electronically controlling a throttle valve in an internal combustion engine as claimed in claim 62, wherein the motor casing body includes a projection projecting to the non-output side; the cover includes a recessed portion fitting over the projection of the motor casing body with the predetermined gap; and the wave washer is disposed in the predetermined gap formed between the projection of the motor casing body and the recessed portion of the cover.*

*64. An apparatus for electronically controlling a throttle valve in an internal combustion engine as set forth in claim 63, wherein the main throttle housing body and the cover are integral parts of a single member.*

*65. An apparatus for electronically controlling a throttle valve in an internal combustion engine as set forth in claim 62, wherein the cover is fixed to the main throttle housing body.*

*66. An apparatus for electronically controlling a throttle valve in an internal combustion engine as set forth in claim 62, further comprising a back-up ring that abuts said wave washer.*

*67. An apparatus for electronically controlling a throttle valve in an internal combustion engine as set forth in claim 66, wherein said wave washer and said back-up ring are disposed between a surface of said motor casing body that is perpendicular to an output axis of said motor and an inner surface of said cover that is perpendicular to the output axis of said motor.*

*68. An apparatus for electronically controlling a throttle valve in an internal combustion engine as set forth in claim 67, wherein the motor casing body includes a main motor body and a cylindrical projection extending outward from the main motor body in a direction towards the non-output side, and*

*wherein the wave washer and back-up ring positioned around the cylindrical projection.*

*69. An apparatus for controlling a throttle valve electronically in an internal combustion engine as set forth in claim 68, wherein the wave washer and back-up ring are sandwiched between the surface of the main motor body and the inner surface of the cover.*

*70. An apparatus for electronically controlling a throttle valve in an internal combustion engine as set forth in claim 62, wherein the wave washer extends around a portion of the motor casing body.*

* * * * *